United States Patent
Zhang et al.

(10) Patent No.: US 7,254,018 B2
(45) Date of Patent: Aug. 7, 2007

(54) COMPUTER ENCLOSURE WITH DRIVE BRACKET

(75) Inventors: Yong-Gang Zhang, Shenzhen (CN); Shao-Bo Han, Shenzhen (CN); Pin-Shian Wu, Tu-Cheng (TW)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 141 days.

(21) Appl. No.: 11/114,689

(22) Filed: Apr. 25, 2005

(65) Prior Publication Data

US 2006/0120033 A1 Jun. 8, 2006

(30) Foreign Application Priority Data

Dec. 2, 2004 (CN) .................. 2004 2 0102443

(51) Int. Cl.
*G06F 1/16* (2006.01)
(52) U.S. Cl. ................ 361/685; 361/727; 312/223.2
(58) Field of Classification Search ............ 361/685, 361/727; 312/223.2
See application file for complete search history.

(56) References Cited

U.S. PATENT DOCUMENTS

| 5,745,342 | A | * | 4/1998 | Jeffries et al. | 361/683 |
| 6,215,664 | B1 | * | 4/2001 | Hernandez et al. | 361/725 |
| 6,661,654 | B2 | * | 12/2003 | Felcman et al. | 361/686 |
| 6,882,527 | B2 | * | 4/2005 | Wang et al. | 361/685 |
| 2004/0075979 | A1 | | 4/2004 | Wang et al. | |

FOREIGN PATENT DOCUMENTS

TW 492614 6/2002

* cited by examiner

*Primary Examiner*—Jayprakash Gandhi
*Assistant Examiner*—Ingrid Wright
(74) *Attorney, Agent, or Firm*—Morris, Manning & Martin LLP; Tim Tingkang Xia, Esq.

(57) ABSTRACT

A computer enclosure includes a chassis (20), a drive bracket (10) rotatably attached to the chassis and a holder (50). The chassis includes a pair of parallel beams (30,40). The drive bracket forms a sliding member (111). The holder is secured to one of the beams of the chassis, and defines a groove (531). A number of holding positions (534) are defined in the groove to selectively hold the sliding member of the drive bracket.

20 Claims, 6 Drawing Sheets

COMPUTER ENCLOSURE WITH DRIVE BRACKET

BACKGROUND OF THE INVENTION

1. Field of the Invention

The present invention relates to a computer enclosure, and more particularly to a computer enclosure with a drive bracket pivotally connected to the computer enclosure.

2. Background of the Invention

Various data storage devices, such as hard disk drives, floppy disk drives, and optical drives are installed in drive brackets. Usually a typical drive bracket is directly secured in a computer enclosure with a plurality of screws. But a space in the computer enclosure is limited particularly for some mini personal computers. It is hard to remove these date storage devices when they need to be repaired.

Therefore pivotable drive brackets have been developed. Taiwan Patent Publication No. 492614 discloses a compute enclosure with two pivotable drive brackets. A mounting plane is secured in the computer enclosure. The mounting panel extends at least one locating tab. The two drive brackets are pivotally attached to the mounting panel on two sides thereof. Each of the two drive brackets integrally extends a supporting leg at one side thereof, and forms a flange at the other side thereof. The flanges of the two drive brackets are rotatably connected with the locating tab by connecting shafts. The supporting legs function as supports when any of the drive brackets is rotated to a position paralleling to the other one. Each of the drive brackets can be pivoted to a folding position upon the other one in case of drive bracket maintenance or assembly. However the two drive brackets only can be positioned on the superposition and cannot be positioned on other inclined positions.

An improved invention that solves the above problem is desired.

SUMMARY

Accordingly, what is needed is a computer enclosure with a drive bracket which is pivotally installed and locatable in inclined position during rotation thereof.

To achieve the above-mentioned object, a computer enclosure includes a chassis, a drive bracket rotatably attached to the chassis and a holder. The chassis includes a pair of parallel beams. The drive bracket forms a sliding member. The holder is secured to one beam of the chassis and defines a groove. A holding position is defined on one site of the groove to hold the sliding member of the drive bracket. While the sliding member slides along the groove, the drive bracket rotates relative the chassis and can be situated in the holding position.

Other advantages and novel features of the present invention will be drawn from the following detailed description of a preferred embodiment of the present invention with attached drawings, in which:

DETAILED DESCRIPTION OF THE INVENTION

Figure 1:
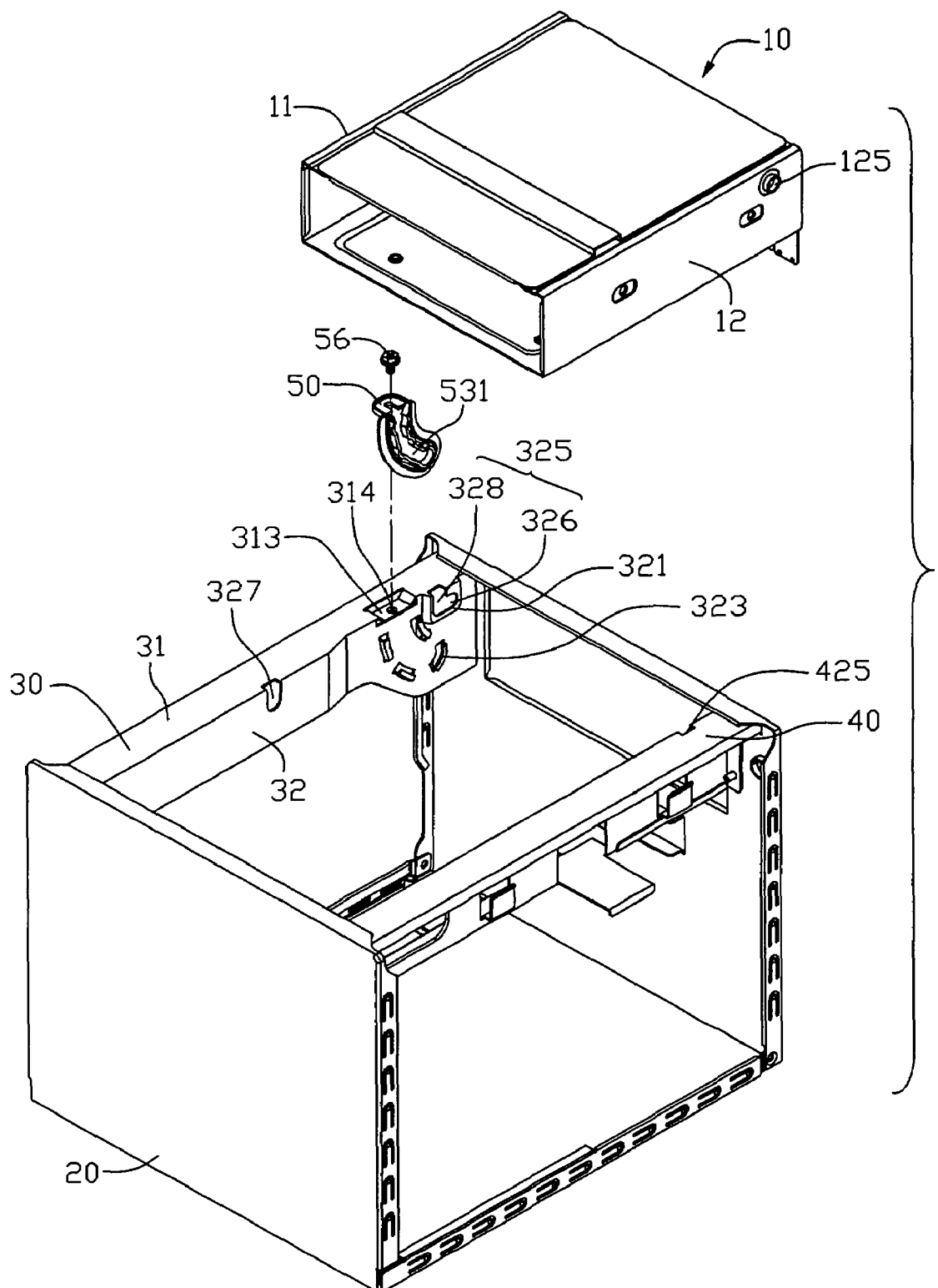
FIG. 1 is an exploded, isometric view of a computer enclosure in accordance with a preferred embodiment of the present invention, comprising a chassis, a drive bracket and a holder.

Referring to FIG. 1, an enclosure of an electronic device like a computer with a drive bracket 10 for receiving components like data storage devices of the computer therein in accordance with the preferred embodiment of the present invention includes a holder 50 which is used for securing the drive bracket 10 to a chassis 20.

Figure 2:
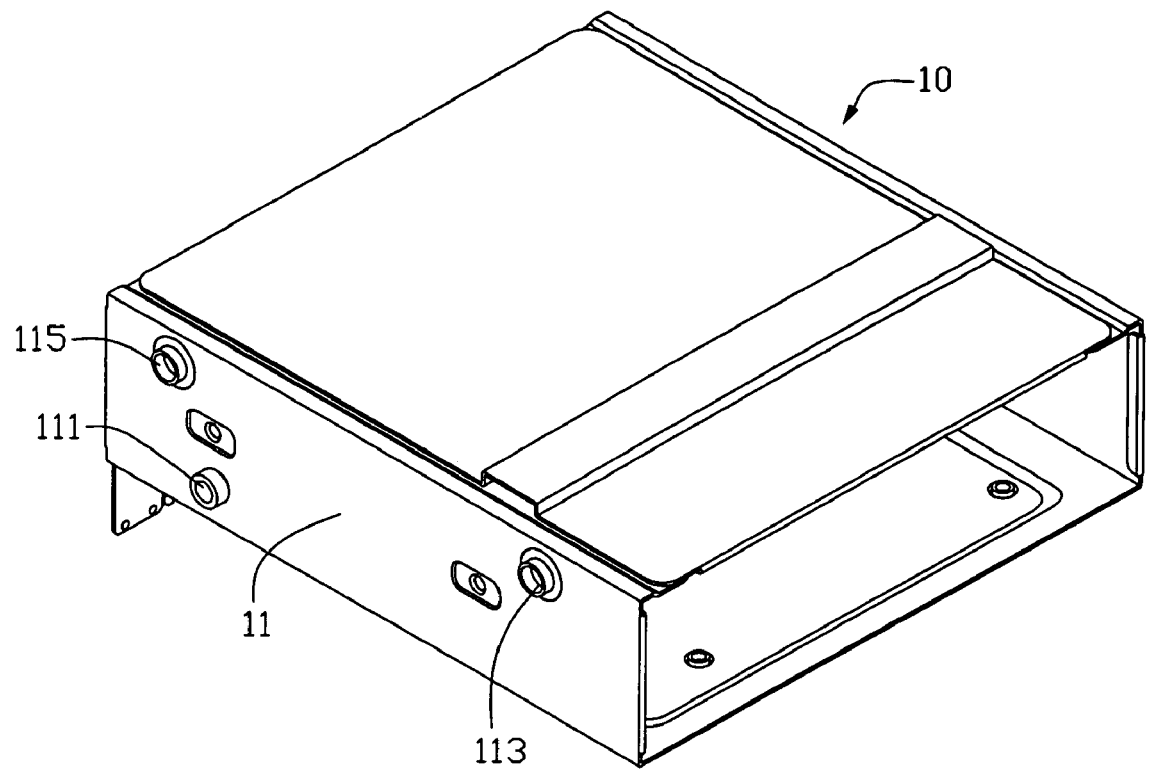
FIG. 2 is an enlarged, isometric view of the drive bracket of FIG. 1.

Referring to FIGS. 1 and 2, the drive bracket 10 comprises a pair of parallel side plates 11, 12 each defining a pivot 115, 125 in a front portion thereof. A supporting protuberance 113 is formed from a rear portion of the side plate 11. A sliding member 111 is formed from the side plate 11 below and behind the pivot 115.

The chassis 20 comprises a first beam 30 and a second beam 40 for supporting the drive bracket 10. The first beam 30 comprises a top panel 31 and a side panel 32. The side panel 32 defines an L-shaped slot 325 in a front portion thereof and a cutout 327 in a middle portion thereof for cooperating with the supporting protuberance 113 of the drive bracket 10. The slot 325 comprises a vertical guiding portion 328 and a horizontal pivot portion 326. The pivot portion 326 is for receiving the pivot 115. The second beam 40 also defines an L-shaped slot 425 for receiving the pivot 125.

The top panel 31 of the first beam 30 defines a concave 313 near the slot 325. The concave 313 defines a screw hole 314. A plurality of bent pieces 323 is formed on the side panel 32 for fastening the holder 50. The bent pieces 323 are arranged to define an arcuate space therebetween.

Figure 3:
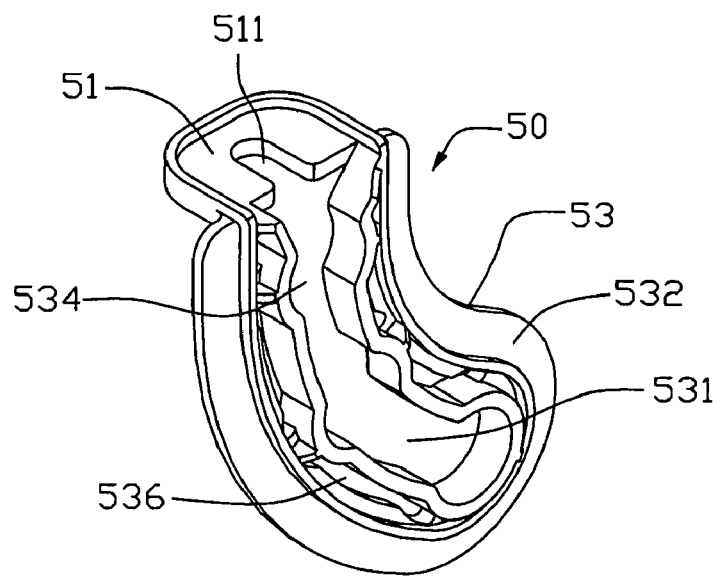
FIG. 3 is an enlarged, isometric view of the holder of FIG. 1.

Referring to FIG. 3, the holder 50 comprises a mounting portion 51 and an arcuate portion 53. A cutout 511 is defined in the mounting portion 51. An arcuate groove 531 is defined along the arcuate portion 53 of the holder 50, and in communication with the cutout 511. An upper portion of the groove 531 is open for the sliding member 111 to slide into the groove 531. A width of the groove 531 is less than a diameter of the sliding member 111. A flange 532 is bent from the arcuate portion 53 along an outside of the groove 531. An interspace 536 is defined between the groove 531 and the flange 532 for providing deformation space so that the opposite sides of the grooves 531 can be resiliently deformed. The ends and middle of the groove 531 expand outward to define three holding positions 534 thereof, and the holding positions 534 can also be defined in other portions of the groove 531.

In assembly, the holder 50 slides along the surface of the side panel 32 and the arcuate portion 53 of the holder 50 slides into the arcuate space formed by the bent pieces 323. The flange 532 of the arcuate portion 53 is restricted by the bent pieces 323, at the same time the mounting portion 51 of the holder 50 is engaged in the concave 313 and the screw hole 314 is aligned with the cutout 511. A screw 56 extends through the cutout 511 and engages in the screw hole 314 to secure the holder 50 to the first beam 30.

The drive bracket 10 is then installed into the chassis 20. The drive bracket 10 is inclined to put the pivots 115, 125 in the guiding portions of the slot 325, 425 and then the pivots 115, 125 slide into the pivot portions of the slots 325, 425.

Figure 4:
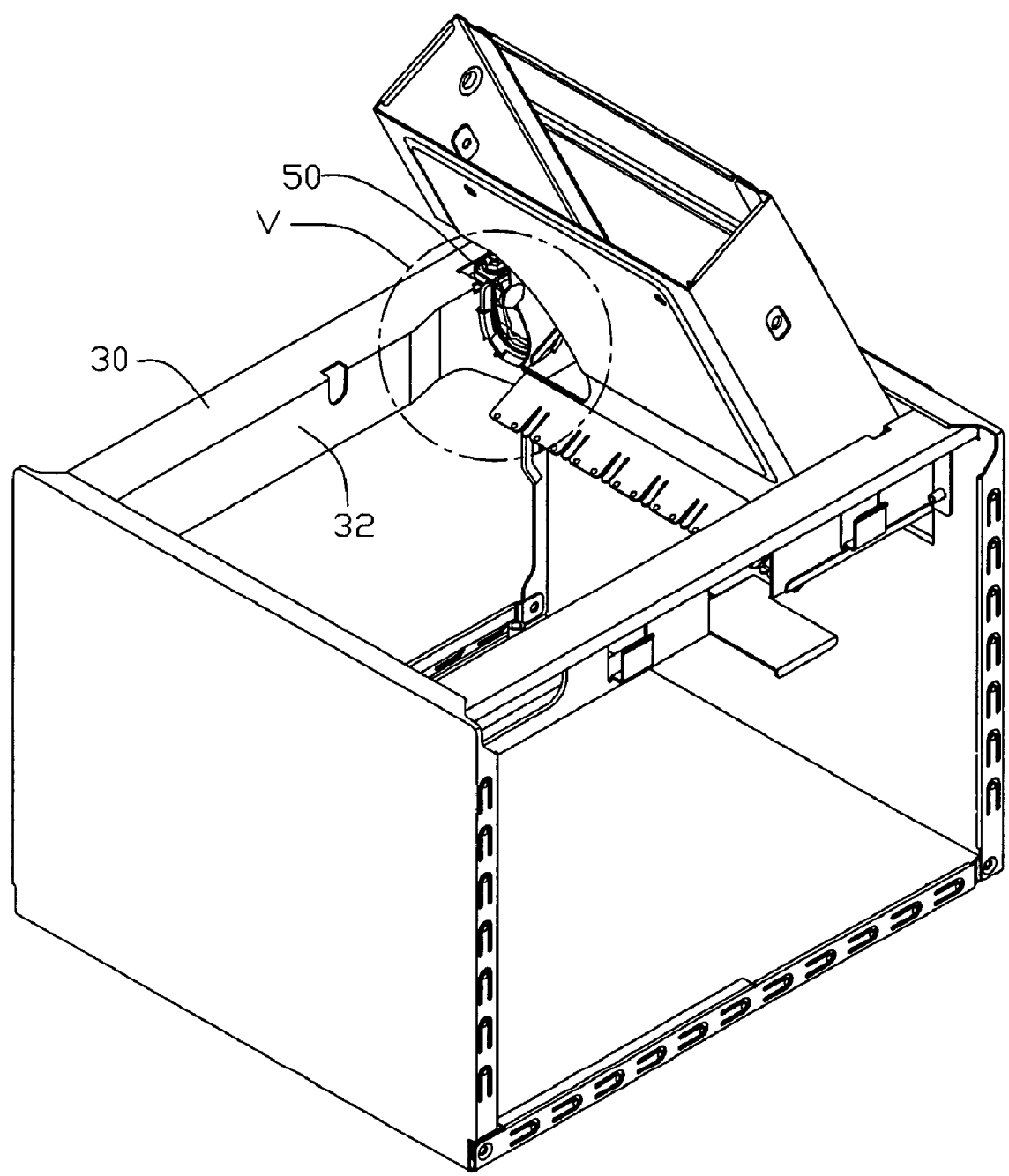
FIG. 4 is an assembled view of FIG. 1, showing the drive bracket being inclined positioned.
Figure 5:
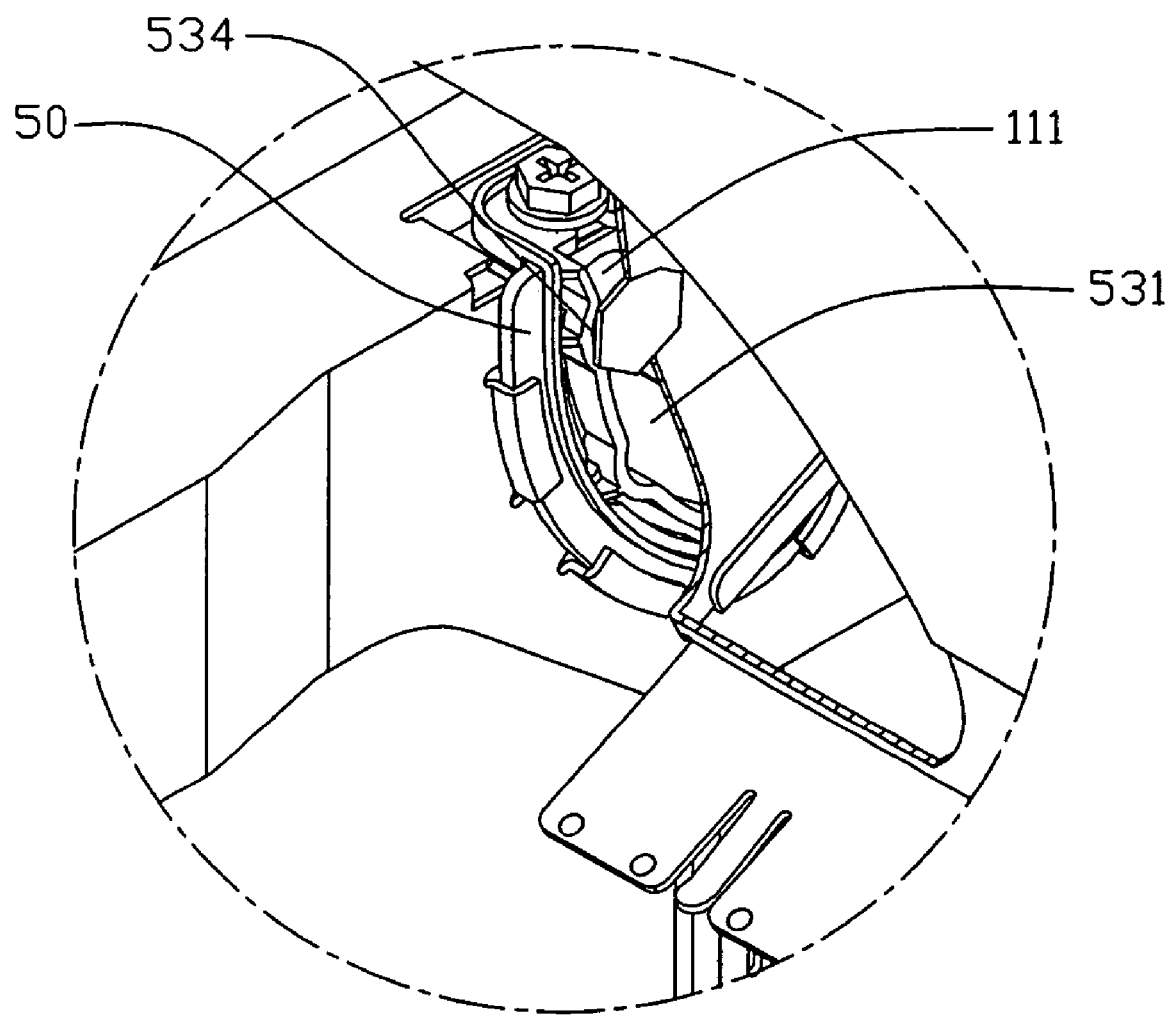
FIG. 5 is an enlarged view of a circled part V of FIG. 4.

Referring to FIGS. 4 and 5, the drive bracket 10 rotates on the chassis 20 by the pivots 115, 125 rotating in the slots 325, 425. The sliding member 111 of the drive bracket 10 intrudes into the groove 531 of the holder 50 and distorts the opposite sides of the groove 531. When the sliding member 111 slides into one of the holding positions 534, the opposite sides of the groove are restored, so the sliding member 111 is engaged in the holding position 534 of the groove 531.

Figure 6:
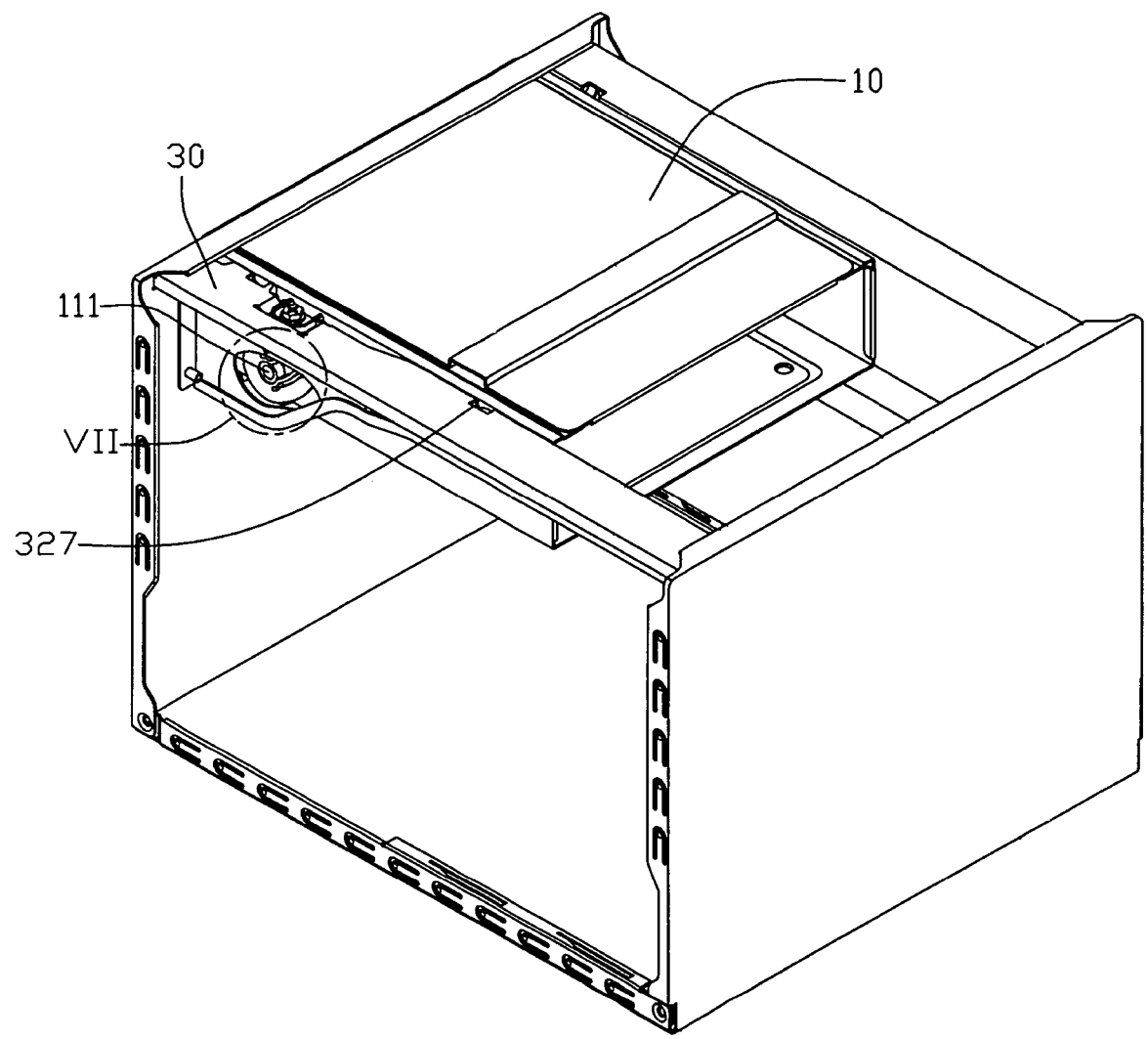
FIG. 6 is a fully assembled view of FIG. 1.
Figure 7:
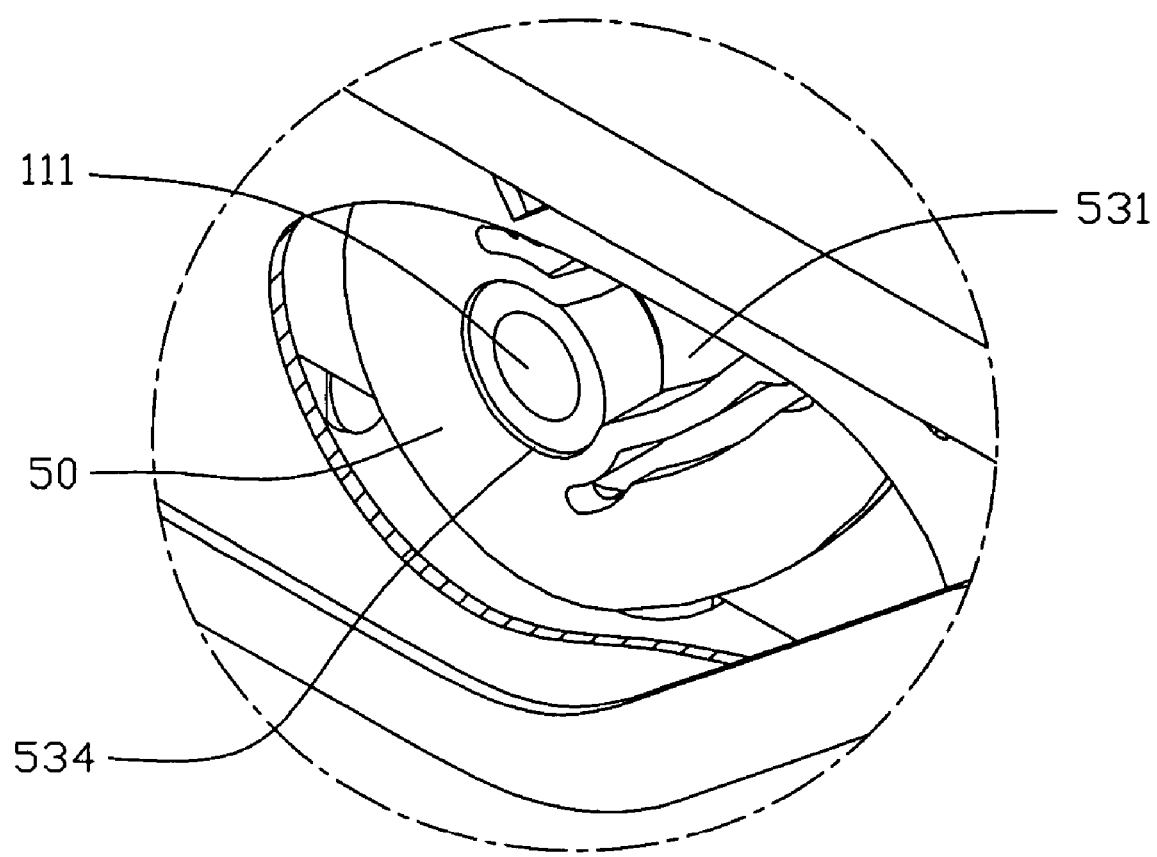
FIG. 7 is an enlarged view of a circled part VII of FIG. 6.

Referring to FIGS. 6 and 7, the drive bracket 10 rotates downwardly until the sliding member 111 is positioned in the undermost holding position 534 of the holder 50. And at the same time the supporting protuberance 113 of the drive bracket 10 is placed into the cutout 327 of the first beam 30, so that the drive bracket 10 is fastened on the chassis 20.

If a data storage device needs to be disassembled from the drive bracket 10, the drive bracket 10 is rotated upwardly and the sliding member 111 of the drive bracket 10 is selectively positioned in one of the upper holding positions 534, so that the drive bracket 10 stays on an inclined position.

It is to be understood, however, that even though numerous characteristics and advantages have been set forth in the foregoing description of the preferred embodiments, together with details of the structure and function the disclosure is illustrative only, and changes may be made in detail, especially in matters of shape, size, equivalent materials, and arrangement of parts within the principles of the invention to the full extent indicated by the broad general meaning of the terms in which the appended claims are expressed.

We claim:

1. A computer enclosure comprising:
   a chassis comprising a pair of beams, an L-shaped slot defined in a front portion of each of the beams;
   a drive bracket configured for holding an electronic component, and comprising a pair of side plates, a pivot formed from a front portion of each of the side plates for being slidably received in a corresponding slot of the chassis, a sliding member formed from one of the side plates of the drive bracket and located at a rear side of a corresponding pivot; and
   a holder secured to one of the beams of the chassis, the holder defining a groove therein, an upper portion of the groove being open for the sliding member to slide into the groove, two opposite side walls of the groove defining at least one pair of recesses to form at least one holding position thereby to hold the sliding member of the drive bracket in said at least one holding position;
   wherein the sliding member slides along the groove, and is held in said at least one holding position of the holder, the drive bracket is inclinedly positioned.

2. The computer enclosure as described in claim 1, wherein the holder forms a flange outside the groove, and said one of the beams comprises a side panel and a plurality of bent pieces formed from the side panel for restricting the flange of the holder.

3. The computer enclosure as described in claim 2, wherein an interspace is defined between the groove and the flange for providing deformation space.

4. The computer enclosure as described in claim 1, wherein a width of the groove is smaller than a diameter of the sliding member.

5. The computer enclosure as described in claim 2, wherein the holder comprises a mounting portion at an upper portion of the groove and perpendicular to the flange, the mounting portion is secured to said one of the beams of the chassis, the chassis defines a concave for receiving the mounting portion.

6. The computer enclosure as described in claim 5, wherein a cutout is defined in the mounting portion, a screw hole is defined in the concave responding to the cutout of the mounting portion.

7. The computer enclosure as described in claim 1, wherein the slot of each of the beams comprises a vertical guiding portion and a horizontal pivot portion.

8. The computer enclosure as described in claim 1, wherein a plurality of holding portions is defined in the groove.

9. The computer enclosure as described in claim 1, wherein the drive bracket forms a supporting protuberance on a rear portion of each of the side plates, and one of the beams defines a cutout for accommodating the supporting protuberance.

10. A mounting assembly comprising:
    a chassis, a plurality of bent pieces formed from the chassis;
    a drive bracket rotatably attached to the chassis, a sliding member formed from a side plate of the drive bracket; and
    a holder comprising an arcuate groove and a flange surrounding side walls of the groove, the holder secured to the chassis via the flange, an interspace defined between side walls of the groove and the flange to provide deformation space when the sliding member slides in the groove, a width of the groove being smaller than a diameter of the sliding member;
    wherein the bent pieces restrict the flange to secure the holder on the chassis, the sliding member slides along the groove and the drive bracket is held in an inclined position.

11. The mounting assembly as described in claim 10, wherein the chassis comprises a pair of beams, and the holder is secured to one of the beams of the chassis.

12. The mounting assembly as described in claim 11, wherein said one of the beams comprises a side panel, and the bent pieces are formed from the side panel.

13. The mounting assembly as described in claim 11, wherein the drive bracket comprises a pair of side plates, a pivot is formed on a front portion of each of the side plates, and a slot is defined in a front portion of each of the beams for receiving the pivot.

14. The mounting assembly as described in claim 10, wherein the groove expands outside to form a holding position in at least one portion of the groove.

15. The mounting assembly as described in claim 10, wherein an upper portion of the groove is open for the sliding member to slide into the groove.

16. The mounting assembly as described in claim 10, wherein the drive bracket forms a supporting protuberance, and one of the beams defines a cutout for accommodating the supporting protuberance.

17. An electronic device comprising:
    a chassis partially enclosing said electronic device and having an opening accessible to an interior of said electronic device;
    a bracket for fixing a component of said electronic device therein and movably attachable to said chassis to move across said opening of said chassis between at least two positions thereof relative to said chassis, said bracket and said component therein being accessibly reachable outside said chassis in one of said at least two positions thereof, and unreachable by enclosing of said chassis in another of said at least two positions; and a holder disposed in said electronic device to engage with one of said bracket and said chassis and temporarily hold said bracket in each of said at least two positions thereof, and movement of said bracket relative to said chassis being available when said holder totally disengages with said one of said bracket and said chassis, said holder defines a groove therein so as to be engagable with a sliding member of one of said bracket and said chassis when said sliding member moves into said groove along an extending direction of said groove from an open end of said groove, said holder comprising a flange surrounding side walls of said groove, for being attached to one of said bracket and said chassis, an interspace defined between side walls of said groove and said flange to provide deformation space of said side walls of said groove when said sliding member slides in said groove, a width of said groove is smaller than a diameter of said sliding member.

18. The electronic device as described in claim 17, wherein said holder further comprises a mounting portion at an upper portion of said groove and perpendicular to said flange, said mounting portion is secured to said electronic device.

19. The electronic device as described in claim 17, wherein said sliding member perpendicularly extends from a side plate of said bracket facing said holder, and deformation directions of said side walls of said groove are parallel to said side plate of said bracket.

20. The electronic device as described in claim 17, wherein a plurality of bent pieces extends from said chassis correspondingly around said holder, each of said plurality of bent pieces is used to receivably hold a part of said flange therein and said plurality of bent pieces commonly defines an arcuate space therebetween to receive said holder in said arcuate space.

\* \* \* \* \*